United States Patent
Imahori et al.

(10) Patent No.: US 8,736,964 B2
(45) Date of Patent: May 27, 2014

(54) HEAD-UP DISPLAY APPARATUS

(71) Applicant: DENSO Corporation, Kariya (JP)

(72) Inventors: Hideaki Imahori, Kariya (JP); Takayuki Fujikawa, Kariya (JP); Hiroshi Ando, Kariya (JP)

(73) Assignee: DENSO Corporation, Kariya (JP)

( * ) Notice: Subject to any disclaimer, the term of this patent is extended or adjusted under 35 U.S.C. 154(b) by 75 days.

(21) Appl. No.: 13/649,439

(22) Filed: Oct. 11, 2012

(65) Prior Publication Data

US 2013/0094092 A1  Apr. 18, 2013

(30) Foreign Application Priority Data

Oct. 14, 2011  (JP) ................................. 2011-227147

(51) Int. Cl.
*G02B 27/14* (2006.01)
*G09G 5/00* (2006.01)
*G02B 27/01* (2006.01)

(52) U.S. Cl.
CPC .... *G02B 27/0101* (2013.01); *G02B 2027/0118* (2013.01); *G02B 2027/012* (2013.01)
USPC ................ 359/633; 359/630; 345/7

(58) Field of Classification Search
CPC .......... G02B 27/01–27/0101; G02B 2027/012; G02B 2027/0118; G02B 5/02; G02B 3/0056
USPC ............. 359/13, 14, 449, 451, 454, 455, 459, 359/599, 619, 620, 627, 630–633; 353/38, 353/79; 345/7–9; 348/115; 349/11
See application file for complete search history.

(56) References Cited

U.S. PATENT DOCUMENTS

| | | | | |
|---|---|---|---|---|
| 6,043,937 | A | * | 3/2000 | Hudson et al. ................ 359/630 |
| 7,377,656 | B2 | * | 5/2008 | Nojima et al. .................. 353/77 |
| 7,688,516 | B2 | * | 3/2010 | Choi et al. .................... 359/631 |
| 7,796,331 | B2 | * | 9/2010 | Mizushima et al. .......... 359/449 |
| 8,294,992 | B2 | * | 10/2012 | Poulsen ........................ 359/624 |
| 2009/0219615 | A1 | | 9/2009 | Kageyama et al. |
| 2013/0050655 | A1 | * | 2/2013 | Fujikawa et al. .............. 353/38 |
| 2013/0050834 | A1 | * | 2/2013 | Fujikawa ...................... 359/630 |

FOREIGN PATENT DOCUMENTS

| | | |
|---|---|---|
| JP | 7-270711 | 10/1995 |
| JP | 2009-205102 | 9/2009 |
| JP | 2010-139927 | 6/2010 |

* cited by examiner

*Primary Examiner* — Thomas K Pham
*Assistant Examiner* — Nicholas Pasko
(74) *Attorney, Agent, or Firm* — Harness, Dickey & Pierce, PLC (57) ABSTRACT

A head-up display apparatus forms a virtual image of a display image viewed from a viewpoint region by projecting the display image onto a projection face. The apparatus includes a screen member and an optical device. The screen member includes an image formation face that forms the display image. The optical device includes a reflection face, which receives and reflects the display image by the image formation face, to project onto the projection face. The image formation face includes, in a grid array, convex portions and concave portions, which are convex and concave from a virtual reference face and alternated with each other along x axis and y axis. A perpendicular line to the virtual reference face at any position of the image formation face passes through an outside of the reflection face of the optical device.

3 Claims, 6 Drawing Sheets

HEAD-UP DISPLAY APPARATUS

CROSS REFERENCE TO RELATED APPLICATION

The present application is based on Japanese Patent Application No. 2011-227147 filed on Oct. 14, 2011, the disclosure of which is incorporated herein by reference.

TECHNICAL FIELD

The present disclosure relates to a head-up display apparatus to enable a visual recognition of a display image as a virtual image from a viewpoint region by projecting the display image to a display member such as a windshield of a vehicle.

BACKGROUND

Patent document 1: JP 2010-139927 A
Patent document 2: JP 2009-205102 A (US 2009/0219615 A1)

A head-up display apparatus is known which reflects using an optical reflection face a display image, which is formed on an image formation face of a screen, thereby projecting the display image on a windshield of a vehicle, for instance, as disclosed in Patent document 1. The above screen for the head-up display apparatus has been recently adopted a configuration disclosed in Patent document 2.

Figure 9:
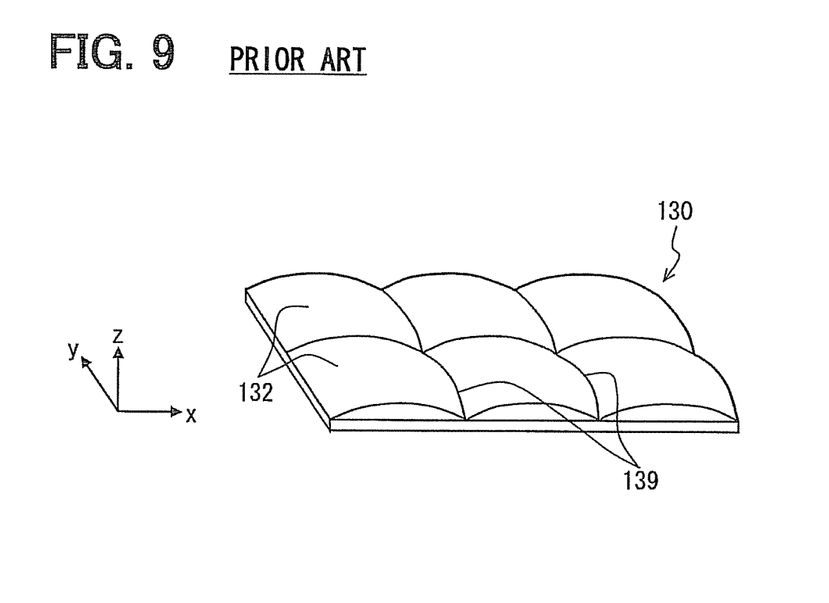
FIG. 9 is a diagram illustrating a schematic configuration of an image formation face of a screen in a prior art.

With reference to FIG. 9, a screen 130 for projection in Patent document 2 includes a plurality of convex lenses 132 arranged in a grid pattern on an xy-coordinate plane that is also referred to as a reference face. The convex lenses 132 reflect or refract incident lights that fall on the image formation face, emitting the lights with a predetermined diffusion angle. The configuration of the head-up display apparatus in Patent document 1 adopting the screen 130 in Patent document 2 accurately controls the light diffusion of the display image formed on the image formation face so as to reach and cover the whole of the viewpoint region. The display image may be viewed clearly as a virtual display image. The screen 130 in Patent document 2 may be thus suitably adopted in a head-up display apparatus with a high display quality.

The present inventors have found the following disadvantage in the configuration combining the technologies of Patent documents 1, 2. That is, the screen 130 in Patent document 2 has necessarily grooves 139 each having a recessed curved surface in between the adjoining concave lenses 132. The curvature of a convex surface of the convex lens 132 may be small enough whereas the curvature of the recessed curved surface of the groove 139 unfortunately becomes significantly large. Thus, the recessed curved surface of the groove 139 inclines significantly against the reference face, i.e., xy-coordinate plane of the screen 130. This causes a normal line that is normal to a recessed curved surface of the groove 139 to incline significantly against the z axial that is orthogonal to the reference face. Herein, the z axis of the screen may be directed at a position outside of the whole of the reflection face by changing the orientation of the screen. However, a normal line that is normal to the recessed curved surface of the groove 139 may unfortunately hit a position inside of the reflection face.

Such a configuration causes the following situation. For instance, outdoor lights that pass through a windshield may fall upon the reflection face, and be reflected towards the screen. Further, the groove of the screen may irregularly reflect and return a part of the outdoor lights towards the reflection face. Then, the reflection face may project the outdoor lights returned from the screen onto the windshield together with the lights of the display image. As a result, the outdoor lights may be unfortunately reflected on the virtual display image viewed from the viewpoint region.

SUMMARY

It is an object of the present disclosure to provide a head-up display apparatus that suppresses a reflection of outside lights on a virtual image of a display image while improving a display quality of the virtual image.

According to an aspect of the present disclosure, a head-up display apparatus is provided as follows. The apparatus achieves a visual recognition of a display image as a virtual display image from a viewpoint region by projecting the display image onto a projection face of a display member. The apparatus includes a screen member and an optical device. The screen member includes an image formation face that forms a display image. The optical device is arranged separate from the screen member and includes a reflection face, which receives and reflects the display image formed by the image formation face, to project onto the projection face of the display member. The screen member and the optical device are arranged in a predetermined three dimensional space having an x axis, a y axis, and a z axis, which mutually intersect orthogonally. Herein, the image formation face includes a plurality of convex portions and a plurality of concave portions along the x axis and the y axis. Each of the convex portions and the concave portions has a predetermined first length along the x axis and a predetermined second length along the y axis. The convex portions and the concave portions are disposed in a grid array where one convex portion is disposed to alternate with one concave portion along each of the x axis and the y axis. A virtual reference face of the image formation face is defined such that the convex portion has a convex face that is convex from the virtual reference face and the concave portion has a concave face that is concave from the virtual reference face. The screen member and the optical device are arranged such that a perpendicular line that is perpendicular to any position of the virtual reference face passes through an outside of the reflection face of the optical device.

Under the above configuration, in the image formation face, the convex portions each having a convex face that is convex from the virtual reference face and the concave portions each having a concave face that is concave from the virtual reference face are arranged to repeatedly alternate with each other while each having predetermined lengths along the x axis and the y axis. This enables the curvatures of the curved faces of the convex portions and concave portions to be effectively small, so that the inclinations of the convex portions and the concave portions against the virtual reference face may be reduced effectively over the whole image information face, as compared with a configuration of an image formation face having only convex portions. Thus, the difference between a normal line that is normal to any position of the image formation face and a perpendicular line that is perpendicular to the virtual reference face at the same position becomes significantly small.

Thus, the outdoor light passing through the projection face of the display member may fall on the reflection face of the optical device and be reflected to the image formation face; thereafter, the outdoor light may be reflected by the image information face, but may not fall on the reflection face again. This suppresses an occurrence of a situation where the outdoor light reflected by the reflection face is projected onto the projection face of the display member together with the lights of the display image so that the outdoor light is reflected on the virtual display image viewed from the viewpoint region. Further, a display quality of the virtual display image is still enhanced by the light diffusion function of the convex portions and the concave portions.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

The following describes an embodiment of the present disclosure with reference to drawings.

(Basic Configuration)

Figure 1:
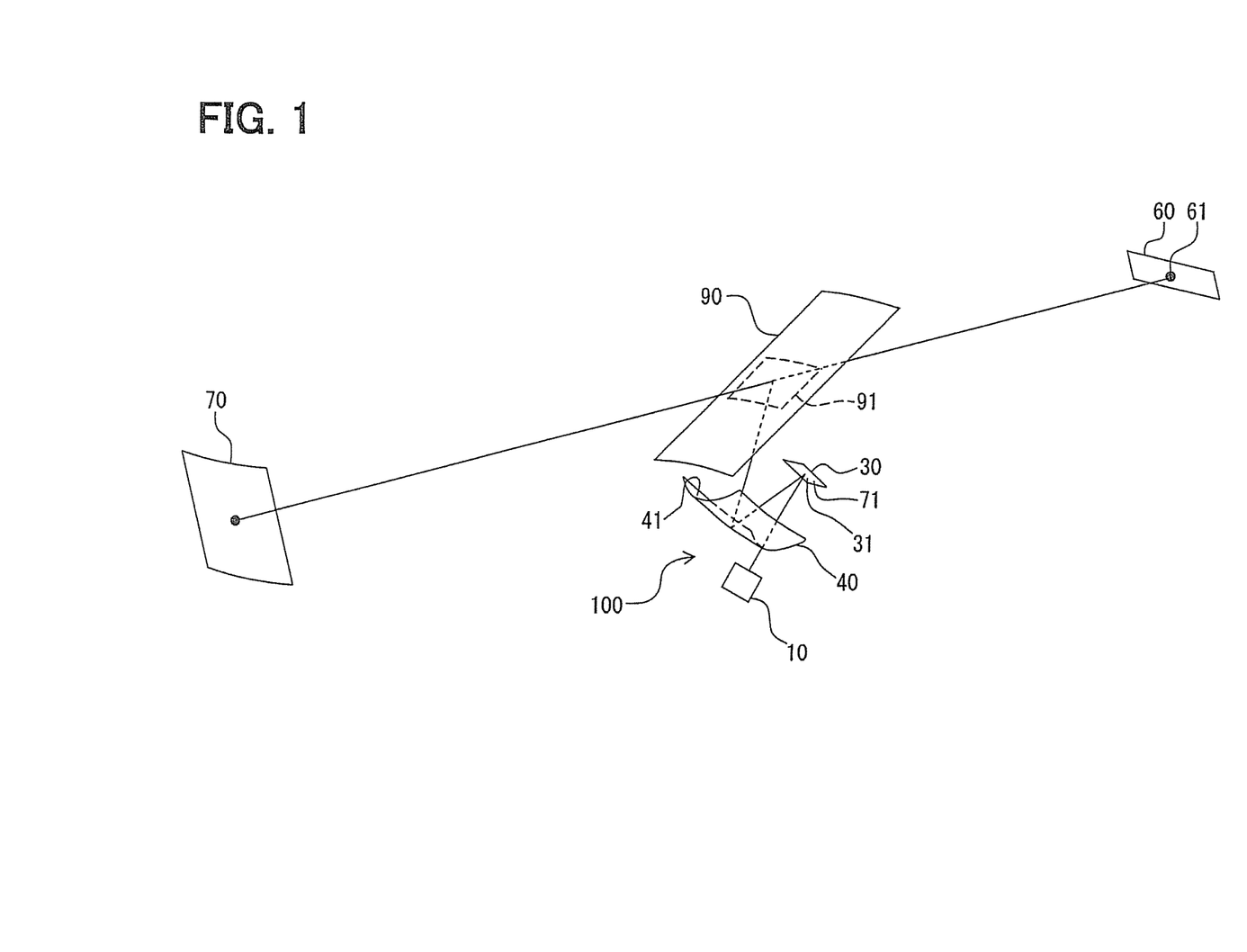
FIG. 1 is a diagram for explaining an arrangement of a head-up display apparatus according to an embodiment of the present disclosure.

A head-up display apparatus 100 according to an embodiment of the present disclosure is contained in an instrument panel of a host vehicle that is a vehicle to which the head-up display apparatus 100 is mounted, for instance. The host vehicle may be referred to as only "the vehicle." A head-up display apparatus 100 projects a display image 71 on a display member such as a windshield 90 of the vehicle, thereby achieving a visual recognition of a virtual display image 70 of the display image 71 from a predetermined eye box 60. The display image 71 is projected by the head-up display apparatus 100 on a projection face 91 on a vehicle-compartment side of the windshield 90. Lights of the display image 71 are projected on the projection face 91 that is curved to be concave from the vehicle compartment. The projection face 91 then reflects the lights towards the eye box 60. The lights reach the eye point 61 of a viewer such as a driver who recognizes visually the lights of the display image. The viewer who perceives the lights of the display image 71 views a virtual display image 70 of the display image 71 that is imaged at a position ahead of the windshield 90.

The display image 71 projected on the projection face 91 is an oblong or wide image that is extended in a lateral direction of the vehicle greater than in a perpendicular direction of the vehicle. The lateral direction may be referred to as a vehicle-width direction; the perpendicular direction may be referred to as a vehicle-height direction. This is because the eye point 61 of a viewer may move in the lateral direction easily than in the perpendicular direction. The display image 71 includes images relative to a travel speed of the host vehicle, instructions of a travel direction by a navigation apparatus, and a warning related to the host vehicle.

With reference to FIG. 1, the head-up display apparatus 100 includes a laser scanner 10, a screen 30, and a concave mirror 40.

The laser scanner 10 is disposed to be diametrically opposed to the projection face 91 via the screen 30 in the perpendicular direction. Further, with reference to FIG. 2, the laser scanner 10 includes a light source 13, an optical portion 20, an MEMS (Micro Electro Mechanical Systems) mirror portion 26, and a controller 11.

Figure 2:
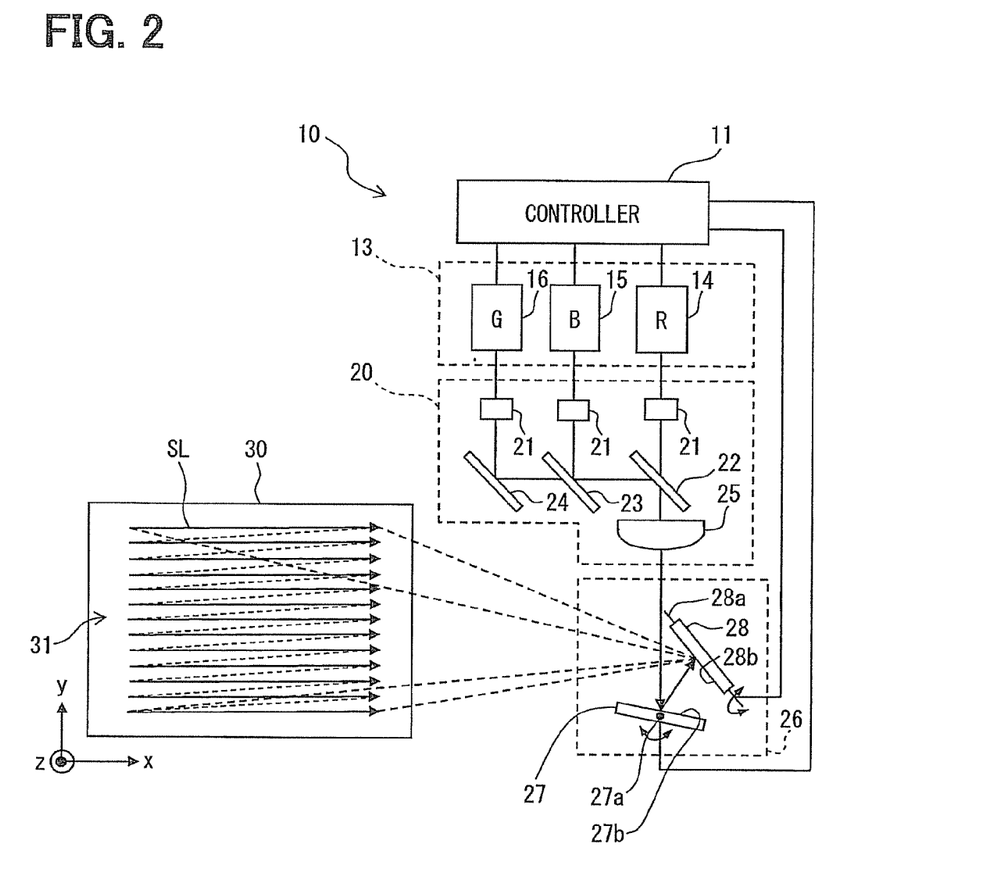
FIG. 2 is a diagram for explaining a configuration and operation of a laser scanner.

The light source 13 includes three laser projection portions 14, 15, and 16. The laser projection portions 14, 15, and 16 project laser lights of mutually different frequencies, i.e., different color phases, respectively. In detail, the laser projection portion 14 projects red laser lights. The laser projection portion 15 projects blue laser lights. The laser projection portion 16 projects green laser lights. Such different color phases are mixed to reproduce a variety of colors. The laser projection portions 14, 15, and 16 are connected individually with the controller 11. Each laser projection portion 14, 15, and 16 projects laser lights of the corresponding color phase based on control signals from the controller 11.

The optical portion 20 includes three collimating lenses 21, dichroic filters 22, 23, and 24, and a converging lens 25. The three collimating lenses 21 are located, respectively, in projection directions of laser lights of the laser projection portions 14, 15, and 16. The collimating lenses 21 refract laser lights to generate parallel lights.

The dichroic filters 22, 23, and 24 are located, respectively, in projection directions of the laser projection portions 14, 15, and 16 via the collimating lenses 21. The dichroic filter 22 located in the projection direction of the laser projection portion 14 transmits lights of frequencies providing the red phase, and reflects lights of frequencies other than the frequencies providing the red phase. The dichroic filter 23 located in the projection direction of the laser projection portion 15 transmits lights of frequencies providing the blue phase, and reflects lights of frequencies other than the frequencies providing the blue phase. The dichroic filter 24 located in the projection direction of the laser projection portion 16 transmits lights of frequencies providing the green phase, and reflects lights of frequencies other than the frequencies providing the green phase. The dichroic filters 22, 23, and 24 cause the laser lights projected by the laser projection portions 14, 15, and 16 to reach the converging lens 25.

The converging lens 25 is a plano-convex lens which has a planar entrance face and a convex emission face. The converging lens 25 refracts laser lights falling on the entrance face to converge. The laser lights passing through the converging lens 25 are focused on the image formation face 31 of the screen 30.

The MEMS mirror portion 26 includes a horizontal scanner unit 27 and a vertical scanner unit 28, for instance. The horizontal scanner unit 27 and vertical scanner unit 28 are connected with the controller 11. The horizontal scanner unit 27 and vertical scanner unit 28 include, respectively, rotation axes 27a and 28a and MEMS reflection faces 27b and 28b formed of vapor-deposited thin films of metal such as aluminum.

The horizontal scanner unit 27 is arranged such that the MEMS reflection face 27b is opposed to both the optical portion 20 and the vertical scanner unit 28. The MEMS reflection face 27b is supported by the rotation axis 27a that is extended in a perpendicular direction, and is rotatable about the rotation axis 27a. The horizontal scanner unit 27 has a drive portion, which rotates the MEMS reflection face 27b about the rotation axis 27a based on drive signals from the controller 11.

In contrast, the vertical scanner unit 28 is arranged such that the MEMS reflection face 28b is opposed to the screen 30 and the MEMS reflection face 27b of the horizontal scanner unit 27. The MEMS reflection face 28b is supported by the rotation axis 28a that is extended in a lateral direction, and is rotatable about the rotation axis 28a. The vertical scanner unit 28 has a drive portion, which rotates the MEMS reflection face 28b about the rotation axis 28a based on drive signals from the controller 11.

The controller 11 includes a processor and connected with the laser projection portions 14, 15, and 16 and the scanner units 27 and 28. The controller 11 outputs control signals to cause the laser projection portions 14, 15, and 16 to emit pulsed laser lights intermittently. In addition, the controller 11 outputs drive signals to the scanner units 27 and 28 to cause the MEMS reflection faces 27b and 28b to control the direction of the laser lights to achieve scanning lines SL illustrated in FIG. 2.

Under the above configuration, the laser scanner 10 projects lights that are formed or imaged as the display image 71 on the image formation face 31 of the screen 30 under the control of the controller 11. Specifically, the laser lights are scanned or projected in dots corresponding to pixels to draw the display image 71 on the image formation face 31 of the screen 30.

With reference to FIGS. 1 and 2, the screen 30 is of reflection type formed by vapor-depositing aluminum or the like on a front face of a base material such as a glass. The image formation face 31 of the screen 30 is formed of a thin film of vapor-deposited metal such as aluminum. The image formation face 31 forms a display image 71 with the laser lights projected from the laser scanner 10.

With reference to FIG. 1, the concave mirror 40 is formed by vapor-depositing aluminum or the like on a front face of a base material such as a glass. The concave mirror 40 is located in the lateral direction of the screen 30. The concave mirror 40 has a reflection face 41 which reflects laser lights that are reflected by the image formation face 31 of the screen 30, towards the projection face 91 of the windshield 90. The reflection face 41 has a smoothly curved convex face whose central portion is opposed to both the image formation face 31 and the projection face 91. The reflection face 41 reflects and enlarges the display image 71 reflected by the image formation face 31, thereby projecting the display image 71 onto the projection face 91. The reflection face 41 has a curve with two mutually different enlargement ratios of the display image 71 between in the lateral direction and in the perpendicular direction. Specifically, the curve in the lateral direction is made greater than the curve in the perpendicular direction so that the display image 71 is enlarged in the lateral direction greater than in the perpendicular direction.

(Featured Configuration)

Figure 3:
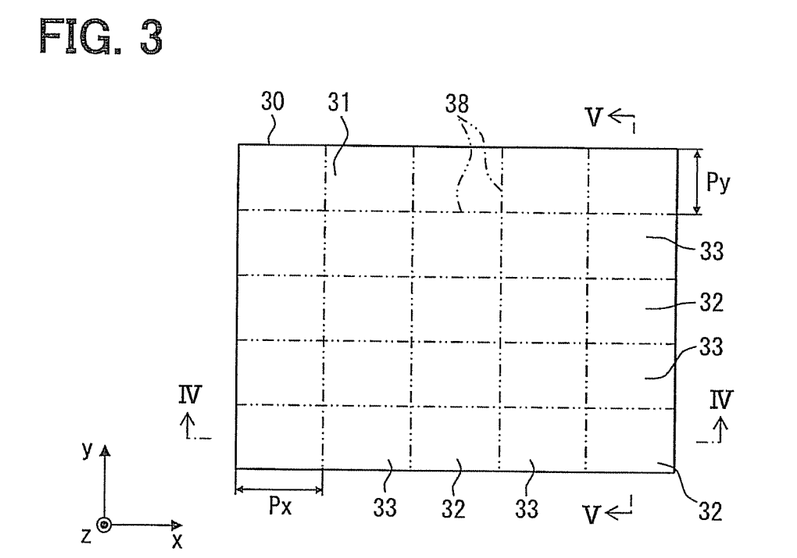
FIG. 3 is a diagram illustrating a schematic configuration of a screen.
Figure 4:
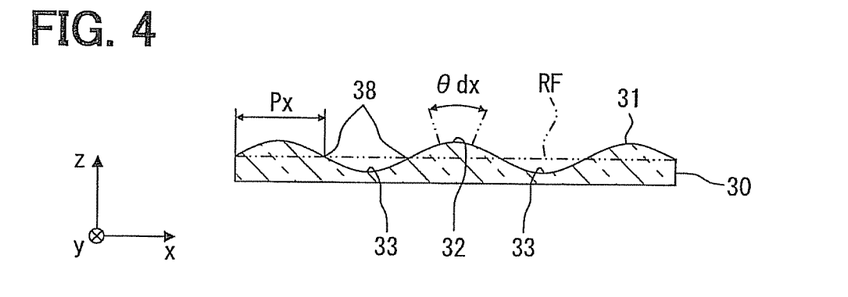
FIG. 4 is a cross-sectional view taken along the line IV-IV in FIG. 3.
Figure 5:
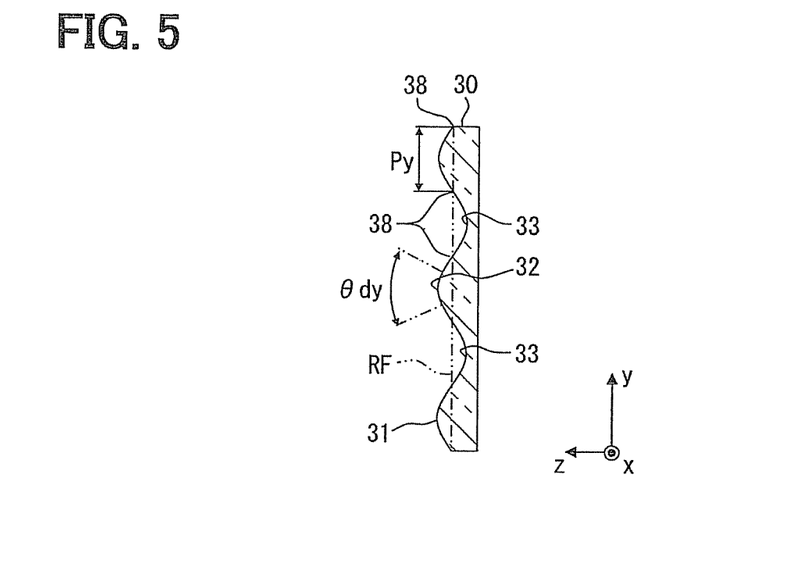
FIG. 5 is a cross-sectional view taken along the line V-V in FIG. 3.

The following will explain a featured configuration of the head-up display apparatus 100 according to the present embodiment. With reference to FIGS. 3 to 5, the screen 30 is so-called a micro mirror array. The image formation face 31 of the screen 30 includes a predetermined number of microscopic convex portions 32 and a predetermined number of microscopic concave portions 33; the convex portions 32 and the concave portions 33 reflect laser lights to the reflection face 41 while simultaneously diffusing the laser lights. Refer to FIG. 3 that illustrates only a part of the screen for a simple explanation. The convex portion 32 and the concave portion 33 each have a length of Px and are arranged to be repeatedly alternated with each other along the x axis of a virtual reference face RF of the image formation face 31 In contrast, the convex portion 32 and the concave portion 33 each have a length of Py and are arranged to be repeatedly alternated with each other along the y axis of the virtual reference face RE Herein, with reference to FIGS. 4, 5, the virtual reference face RF is defined as dividing an up-down waveform formed by the mutually alternating convex portions 32 and concave portions 33 into an upper portion and a lower portion within the image formation face 31 of the screen 30. Further, in the present embodiment, the virtual reference face RF is planate and parallel with an xy-coordinate plane defined by the x axis and the y axis. The convex portion 32 is shaped of a convex protruded from the virtual reference face RF in the image formation face 31. The concave portion 33 is shaped of a concave depressed from the virtual reference face RF in the image formation face 31. Further, with reference to FIG. 1, the virtual reference face RF is used as a reference to determine an orientation or direction of the image formation face 31 of the screen 30 for specifying optical axes to advance from the laser scanner 10 via the screen 30 to the concave mirror 40.

The length Px of each portion 32 and 33 along the x axis is greater the length Py of each portions 32 and 33 along the y axis. A curvature of the curve in a zx cross-section of the convex portion 32 and concave portion 33 is smaller than a curvature of the curve in a yx cross-section of the convex portion 32 and concave portion 33. Therefore, a diffusion angle θdx in a zx-coordinate plane of lights reflected by the image formation face 31 is smaller than a diffusion angle θdy in a yz-coordinate plane.

The curves of the convex portion 32 and the concave portion 33 in the zx cross-section and the yz cross-section have waveforms of sine waves with the virtual reference face RF centered. Such a configuration may be referred to as a sine-waveform micro lens array. The convex portion 32 and the concave portion 33 have an identical curve; namely, they are arranged to be symmetrical with respect to a transition portion 38. The sectional shape of the sine-waveform micro lens array causes the transition portion 38 which is in between the adjoining convex portion 32 and concave portion 33 to be a smooth and gently-sloping shape, which may not cause an irregular reflection. Further, the transition portion 38 is referred to as a maximum inclination portion 38 having a maximum inclination angle against the virtual reference face RF. The reduction in the inclination angle of the maximum inclination portion 38 results in the reduction in inclinations against the virtual reference face RF in any position on all the concave portions 33 and the convex portions 32 in the whole of the image formation face 31.

Figure 6:
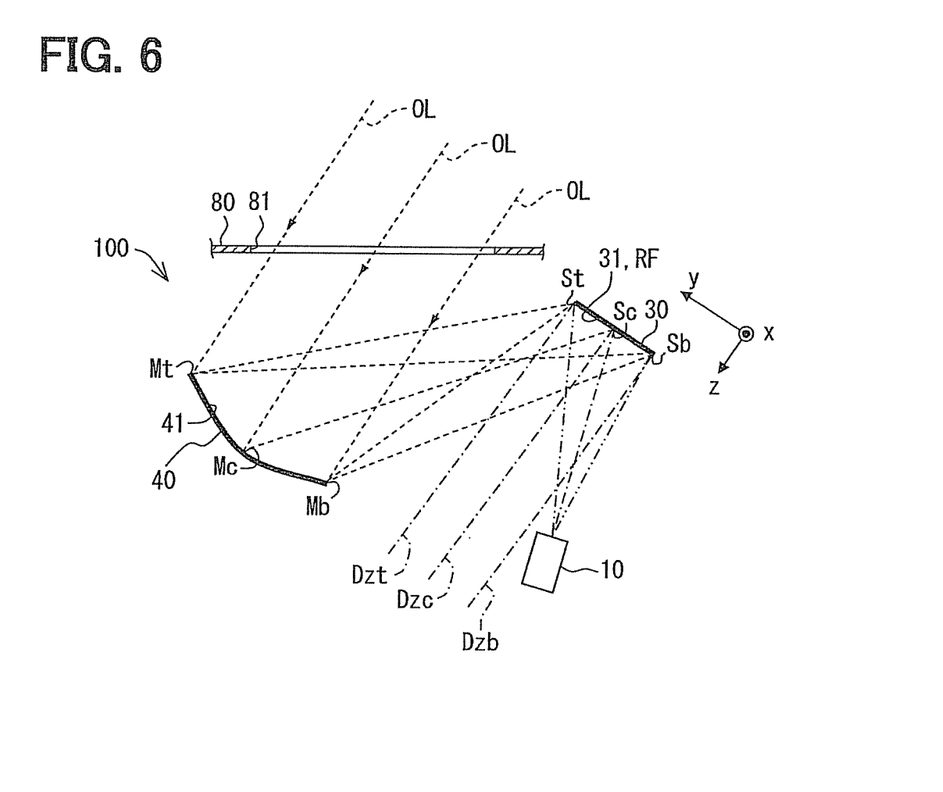
FIG. 6 is a diagram for explaining an arrangement of the screen.

As illustrated in FIG. 6, the screen 30 is contained in a housing 80 of the head-up display apparatus 100 so as to have a posture to rotate the virtual reference face RF of the image formation face 31 about the x axis to be opposed to a region lower than a bottom edge position Mb of the reflection face 41. That is, any perpendicular line that is perpendicular to the virtual reference face RF within the image formation face 31 is along the z axis and opposed to or directed at a region outside of the reflection face 41. For descriptive purposes, the image formation face 31 in FIG. 6 is assumed to have a top edge position St, a center position Sc, and a bottom edge position Sb along the y axis. Furthermore, a perpendicular line Dzt is defined to be along the z axis and perpendicular to the virtual reference face RF at the top edge position St; a perpendicular line Dzc is defined to be along the z axis and perpendicular to the virtual reference face RF at the center position Sc; and a perpendicular line Dzb is defined to be along the z axis and perpendicular to the virtual reference face RF at the bottom edge position Sb. All the perpendicular lines Dzt, Dzc, Dzb are directed at a region outside of the reflection face 41, i.e., do not hit any surface portion of the reflection face 41.

As mentioned above, the maximum inclination portion 38 is provided to have a significantly small inclination against the virtual reference face RF by adopting the above mentioned sine-waveform micro lens array according to the present embodiment.

Thus, the present embodiment helps prevent the outdoor light OL that is again reflected to the reflection face 41 from the image formation face 31 from being projected onto the projection face 91 together with the laser lights of the display image 71. This suppresses the reflection of the outdoor lights OL on the display image 71 sighted from the eye box 60 while enhancing the quality of the virtual display image 70 using the light diffusion function of the screen 30 having the micro mirror array.

Furthermore, an optional featured configuration according to the present embodiment will be explained as follows. Herein, the perpendicular line Dzt in the z axis from the top edge position St, which is premised to be a maximum inclination portion 38, of the image formation face 31 is closer to the reflection face 41 than other perpendicular lines Dzc, Dzb. Yet further, with reference to FIG. 7, a normal line Dnt is defined as a normal line that is normal to the image formation face 31 at the top edge position St. The normal line Dnt has a highest possibility of hitting at a surface portion within the reflection face 41 of the concave mirror 40 among other normal lines that are normal to the image formation face 31 since the top edge position St corresponds to the maximum inclination portion 38.

Figure 7:
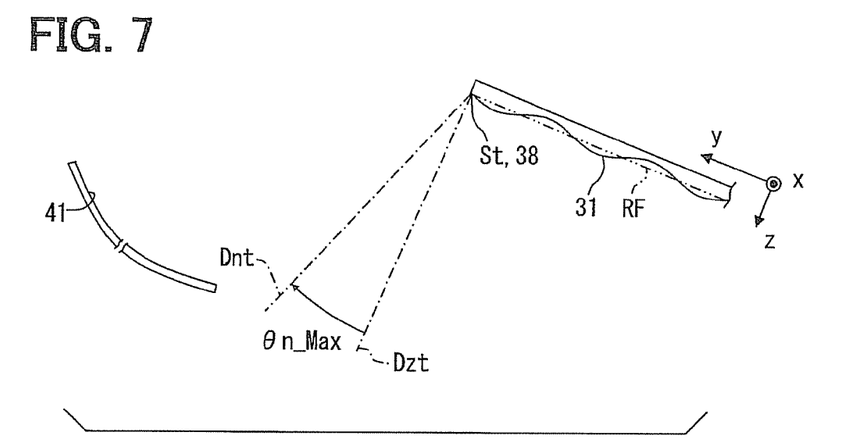
FIG. 7 is a diagram for explaining that a normal line that is normal to an image formation face is directed at a position outside of a reflection face.

Preferably, the sine-waveform micro lens array according to the present embodiment may be modified to further consider an inclination θn_Max of the normal line Dnt against the z axis Dzt at the maximum inclination portion 38 at the top edge position St in the y axis. That is, the normal line Dnt is designed to be directed at a region outside of the reflection face 41, i.e., do not hit any surface portion of the reflection face 41. Thus, all the normal lines that are normal to the image formation face 31 are provided to be directed at a region outside of the reflection face 41, i.e., do not hit any surface portion of the reflection face 41.

With reference to FIG. 6, the following will explain the reflections of outdoor lights, specifically. Outdoor lights OL passing through the windshield 90 may further pass through an opening portion 81 of a translucent acrylic panel of the housing 80 and fall on the reflection face 41. Further, outdoor lights OL may fall on the reflection face 41 from a direction other than those illustrated in FIG. 6. For descriptive purposes, a top edge position of the reflection face 41 is referred to as Mt; a center position is as Mc; and a bottom edge position is as Mb. The outdoor lights OL go from each of the positions Mt, Mc, Mb of the reflection face 41 towards any one of the positions St, Sc, and Sb of the image formation face 31.

Figure 8:
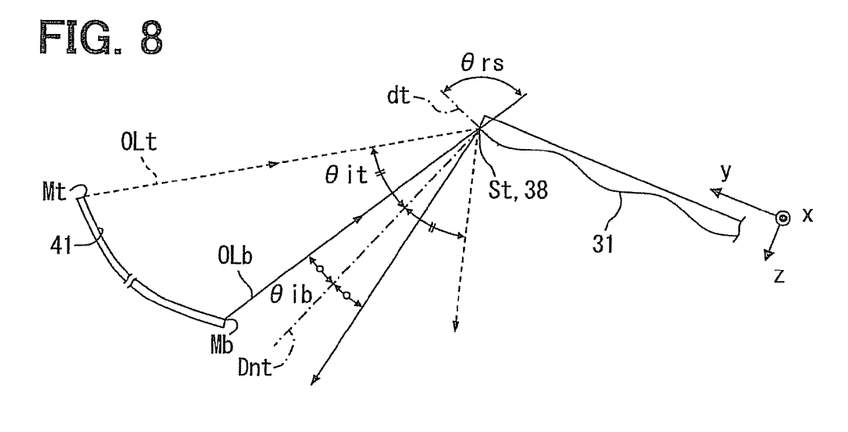
FIG. 8 is a diagram for explaining that an outdoor light is reflected towards an outside of the reflection face.

With reference to FIG. 8, an incident angle is defined as an angle formed between (i) an incident light and (ii) the normal line Dnt that is normal to the top edge position St, which is premised to be a maximum inclination portion 38, of the image information face 31. An incident angle θib is formed when an outdoor light OLb reflected at the bottom edge position Mb of the reflection face 41 falls on the top edge portion St of the image formation face 31; an incident angle θit is formed when an outdoor light OLb reflected at the top edge position Mt of the reflection face 41 falls on the top edge position St of the image formation face 31. As illustrated in FIG. 8, the outdoor light OLb is reflected to a position closer to the reflection face 41 than the outdoor light OLt. However, since the normal line Dnt is directed at a position outside of the reflection face 41, even the outdoor light OLb falling on the top edge position St is reflected towards a position farther from the bottom position Mb of the reflection face 41 compared with the perpendicular line Dnt. Furthermore, an angle θrs at the top edge position St being a maximum inclination portion 38 in the yz-coordinate plane is defined as being formed between (i) a tangent dt and (ii) a straight line from any position of the reflection face 41. When this angle θrs is more than 90 degrees, any outdoor light OL that is reflected by the reflection face 41 of the concave mirror 40 and then reflected by the image formation face 31 of the screen 30 can be directed at a position outside of the reflection face 41.

Under such a configuration, the outdoor lights OL that reach and fall on the image formation face 31 are certainly reflected towards a position outside of or departed from the reflection face 41, resulting in further avoiding the situation where the outdoor lights OL are projected onto the projection face 91 along with the lights of the display image 71 and resulting in further suppressing the reflection of the outdoor lights OL on the virtual display image 70 sighted from the eye box 60.

Furthermore, the image formation face 31 having a configuration of reflecting lights results in acquiring a broader diffusion angle while keeping small the curvature of the convex portion 32 and the concave portion 33, as compared with an image formation face having a configuration of refracting lights. This reduces the inclination of the concave portion 33 and the convex portion 32 against the virtual reference face RF; namely, this reduces the inclination θn_MAX between (i) the normal line Dnt that is normal to the maximum inclination portion 38 and (ii) the perpendicular line or z axis Dzt that is perpendicular to the virtual reference face RF at the maximum inclination portion 38.

The laser scanner 10 may be referred to as a projector. The screen 30 may be referred to as a screen member. The concave mirror 40 may be referred to as an optical device. The eye box 60 may be referred to as a viewpoint region. The windshield 90 may be referred to as a display member.

(Other Embodiments)

Up to this point, description has been given to one embodiment of the present disclosure. However, the present disclosure is not limited to the above embodiment, and it can be variously embodied within a scope not departing from the subject matter of the present disclosure.

The above explains, as a non-limiting example, the micro mirror array where the screen 30 is of a reflection type that reflects laser lights to the reflection face 41 while simultaneously diffusing the laser lights via the image formation face 31. Another example may be a micro lens array where the screen 30 is of a refraction type that refracts and simultaneously diffuses laser lights via the image formation face 31, and directs the laser lights to the reflection face 41.

The above embodiment adopts, as a projector, the laser scanner 10 that images a display image 71 on the image formation face 31 by scanning laser lights. Any projector may be adopted as long as it images a display image on an image formation face. Another non-limiting example of a projector may be a liquid crystal on silicon (LCOS) or a digital mirror device (DMD), which includes a light source and a lens and projects lights to the image formation face 31 of the micro lens array from a position diametrically opposite to the reflection face 41 with respect to the perpendicular line that is perpendicular to the virtual reference face RF of the screen 30.

The LCOS is formed to sandwich a liquid crystal layer between a silicon substrate and a translucent substrate. The liquid crystal layer is formed of a plurality of pixels. The silicon substrate is provided with a circuit for driving the liquid crystal and an electrode for reflecting lights. Lights from the light source pass through the translucent substrate and the liquid crystal layer. The lights are then reflected by the electrode in the silicon substrate, emitting from the LCOS. If the liquid crystal layer forms an original image that becomes a display image, the LCOS can project the lights that are imaged on the image formation face.

The DMD is formed of a plurality of microscopic mirror faces that are arrayed on a substrate. Each of the microscopic mirror faces forms one pixel. Each microscopic mirror face can change an inclination angle based on control signals. Lights from a light source are reflected by each microscopic mirror face. The DMD controls the inclination angle of each microscopic mirror face to thereby form an image. The DMD can project the lights that are imaged on the image formation face.

In the above embodiment, the z axis of the virtual reference face RF is directed at a position below the reflection face 41, as shown in FIG. 6. However, as long as the z axis is directed at a position outside of the reflection face 41, the direction of the z axis need not be limited to the position below the reflection face 41. For example, suppose a case that the laser scanner 10 is disposed in the lateral direction of the screen 30. In this case, it is preferable that the z axis or the perpendicular line perpendicular to the virtual reference face of the image formation face is directed between (i) the reflection face 41 of the concave mirror 40 and (ii) the laser scanner 10, in the lateral direction. The normal line in the zx-coordinate plane to an edge position of the image formation face 31 that is most distant from the laser scanner 10 is directed at a position in between the concave mirror 40 and the laser scanner 10.

In the above embodiment, the image formation face 31 includes the convex portions 32 and the concave portions, forming a cross-sectional shape of a sine waveform. However, as long as a transition portion between the convex portion and the concave portion is smooth, the shape of the image formation face may be modified. For example, the convex portion and the concave portion may form a parabolic curve. In addition, the convex portion 32 and the concave portion 33 may not be symmetrical about the transition portion 38. Furthermore, the length of the concave portion may be slightly different from that of the convex portion. In addition, the length Px along the x axis of each of the convex portion 32 and the concave portion 33 may be identical to or smaller than the length Py along the y axis. Further, the Px and Py may be suitably changed according to a shape or magnitude of the configuration of the optical device and/or the eye box.

In the above embodiment, the concave mirror 40 is a single component of the optical device. The optical device may be formed of more than one lens such as a combination of a reflection mirror and a lens, for example. In addition, the reflection mirror included in the optical device may be a plane mirror or convex mirror.

In the above embodiment, the virtual reference face RF of the image formation face 31 is planate, i.e., parallel with an xy-coordinate plane. However, a head-up display apparatus may provide an image formation face with a curve to amend a three-dimensional distortion of a virtual display image. In such an apparatus, the virtual reference face of the image formation face may be curved.

In the above embodiment, the windshield 90 is used as a display member. However, the display member forming a projection face is not limited to the windshield 90. For example, the display member may be a combiner which is composed of a transparent material laminated on a vehicle-compartment side of the windshield 90. Such a combiner may be alternatively provided as a different body separate from the windshield 90.

In the above embodiment, the MEMS mirror portion 26 equipped with two scanner units 27 and 28 is used to scan laser lights. Alternatively, an MEMS mirror may be provided to have a single reflection face that is moved about two different movable shafts to perform two-dimensional scanning for replacing the horizontal scanner unit 27 and vertical scanner unit 28.

In the above embodiment, the head-up display apparatus 100 is mounted in a vehicle and projects a display image 71 on the windshield 90 of the vehicle. Without need to be limited thereto, the present disclosure may apply to a head-up display apparatus to be provided in a transport machine and achieve a visual recognition of a virtual display image 70 of a display image 71 from a viewer.

While aspects of the disclosure described herein are already recited in the preceding summary, further optional aspects thereto may be set out as follows.

For instance, as an optional aspect of the disclosure, the screen member and the optical device may be arranged such that a normal line that is normal to any position on the convex faces of the convex portions and the concave faces of the concave portions in the image formation face of the screen member passes through an outside of the reflection face of the optical device.

Under this configuration, the normal line that is normal to any position of the image formation face is directed at a position outside of the reflection face so that the outdoor light falling on the image formation face may be certainly reflected towards a position outside of or departed from the reflection face. The projection of the outdoor light to the projection face may be certainly avoided, further suppressing an occurrence of the situation where the outdoor light is reflected on the virtual display image sighted from the viewpoint region.

As another optional aspect, a projector may be further included to project lights that are formed as the display image in the image formation face. Herein, the image formation face may reflect the lights, which are from the projector, to the reflection face of the optical device while simultaneously diffusing the lights.

In general, the image formation face may emit lights of a display image towards the reflection face by reflecting or refracting the lights of the display image. Under the above configuration, the image formation face is a type of reflecting so that the lights are reflected by the convex portions and the concave portions. The image formation face of the type of reflecting may acquire a broader light diffusion angle while enabling the curvatures of the convex portions and the concave portions to be smaller, as compared with an image formation face of the type of refracting. Therefore, the inclinations of the convex portion and concave portion against the virtual reference face may be further reduced; eventually, the inclination of the normal line that is normal to any position of the image formation face against the perpendicular line that is perpendicular to the virtual reference face at the same position is further reduced.

The projection of the outdoor light to the projection face may be certainly avoided, suppressing further an occurrence of the situation where the outdoor light is reflected on the virtual display image sighted from the viewpoint region.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A head-up display apparatus to achieve a visual recognition of a display image as a virtual display image from a viewpoint region by projecting the display image onto a projection face of a display member,
the apparatus comprising:
a screen member including an image formation face that forms a display image; and
an optical device arranged separate from the screen member, the optical device including a reflection face, which receives and reflects the display image formed by the image formation face, to project the display image onto the projection face of the display member,
the screen member and the optical device being arranged in a predetermined three dimensional space having an x axis, a y axis, and a z axis, which mutually intersect orthogonally,
wherein:
the image formation face includes a plurality of convex portions and a plurality of concave portions along the x axis and the y axis,
each of the convex portions and the concave portions having a predetermined first length along the x axis and a predetermined second length along the y axis,
the convex portions and the concave portions being disposed in a grid array where one convex portion is disposed to alternate with one concave portion along each of the x axis and the y axis,
a virtual reference face of the image formation face being defined such that the convex portion has a convex face that is convex from the virtual reference face and the concave portion has a concave face that is concave from the virtual reference face; and
the screen member and the optical device are arranged such that a perpendicular line that is perpendicular to any position of the virtual reference face passes through an outside of the reflection face of the optical device.

2. The head-up display apparatus according to claim 1, wherein:
the screen member and the optical device are arranged such that a normal line that is normal to any position on the convex faces of the convex portions and the concave faces of the concave portions in the image formation face of the screen member passes through an outside of the reflection face of the optical device.

3. The head-up display apparatus according to claim 1, further comprising:
a projector to project lights that are formed as the display image in the image formation face,
wherein the image formation face reflects the lights, which is from the projector, to the reflection face of the optical device while simultaneously diffusing the lights.

* * * * *